United States Patent
Kannan et al.

(10) Patent No.: US 9,990,599 B1
(45) Date of Patent: Jun. 5, 2018

(54) METHOD AND SYSTEM FOR MULTIDISCIPLINARY RESEARCH COLLABORATION

(71) Applicant: Massachusetts Mutual Life Insurance Company, Springfield, MA (US)

(72) Inventors: Gopika Kannan, West Hartford, CT (US); Jennifer Fabrizi, Amherst, MA (US); Robert Polkowski, Boston, MA (US)

(73) Assignee: Massachusetts Mutual Life Insurance Company, Springfield, MA (US)

( * ) Notice: Subject to any disclaimer, the term of this patent is extended or adjusted under 35 U.S.C. 154(b) by 435 days.

(21) Appl. No.: 14/571,464

(22) Filed: Dec. 16, 2014

Related U.S. Application Data

(60) Provisional application No. 61/918,812, filed on Dec. 20, 2013.

(51) Int. Cl.
*G06Q 10/06* (2012.01)
*G06F 17/30* (2006.01)

(52) U.S. Cl.
CPC . *G06Q 10/06398* (2013.01); *G06F 17/30386* (2013.01)

(58) Field of Classification Search
None
See application file for complete search history.

(56) References Cited

U.S. PATENT DOCUMENTS

| | | | |
|---|---|---|---|
| 2001/0054032 A1 | 12/2001 | Goldman et al. | |
| 2004/0006566 A1 | 1/2004 | Taylor et al. | |
| 2004/0088325 A1* | 5/2004 | Elder | G06Q 10/10 |
| 2007/0136429 A1* | 6/2007 | Fine | G06F 17/30867 |
| | | | 709/206 |
| 2008/0208671 A1* | 8/2008 | Ehrlich | G06Q 10/063112 |
| | | | 705/7.14 |
| 2008/0301105 A1 | 12/2008 | Chen et al. | |
| 2009/0307129 A1 | 12/2009 | Matkowsky et al. | |
| 2010/0325214 A1 | 12/2010 | Gupta | |
| 2013/0006717 A1* | 1/2013 | Oleson | G06Q 10/06311 |
| | | | 705/7.41 |
| 2013/0007036 A1 | 1/2013 | Childs et al. | |
| 2013/0086495 A1 | 4/2013 | Guzansky et al. | |
| 2013/0091456 A1 | 4/2013 | Sherman et al. | |
| 2013/0110641 A1 | 5/2013 | Ormont et al. | |
| 2013/0304763 A1* | 11/2013 | Esposito | G06F 17/30 |
| | | | 707/783 |
| 2014/0075004 A1 | 3/2014 | Van Dusen et al. | |

OTHER PUBLICATIONS

Lynda Gratton and Tamara J. Erickson, Eight Ways to Build Collaborative Teams, Nov. 2007, Harvard Business Review.*

* cited by examiner

*Primary Examiner* — Matthew S Gart
*Assistant Examiner* — Akosua Kyereme-Tuah
(74) *Attorney, Agent, or Firm* — Eric L. Sophir; Dentons US LLP

(57) ABSTRACT

A system and method for multidisciplinary team collaboration may include an algorithm for determining suitable relationships between the team members; a visualization interface for illustrating and managing members in separate groups according to their profiles, expertise, work output, and/or project roles; and the analysis of how members interact and use knowledge content. In the disclosed method, lived-work practices and/or knowledge content may be incorporated in the system to account for human behavior and expand upon existing documented work processes.

21 Claims, 6 Drawing Sheets

METHOD AND SYSTEM FOR MULTIDISCIPLINARY RESEARCH COLLABORATION

CROSS-REFERENCE TO RELATED APPLICATIONS

This application claims priority to U.S. Provisional Patent Application Ser. No. 61/918,812, entitled "Methods and Systems for Multidisciplinary Research Collaboration," filed Dec. 20, 2013, which is hereby incorporated by reference in its entirety.

TECHNICAL FIELD

The present disclosure relates in general to systems and methods for managing knowledge, and more specifically, to methods and frameworks for multidisciplinary collaboration.

BACKGROUND

Multidisciplinary collaboration may include a team of professionals in different disciplines (different areas of expertise). A team that takes part in multidisciplinary collaboration may combine the efforts and work output of project managers, business analysts, engineers, and other professionals that may not be integrated within the same knowledge ecosystem. Each of these team members may be responsible for the creation and sharing of knowledge content. For example, some team members may be responsible for authorizing this knowledge, while some others may be in charge of reviewing, consuming, or monitoring its status.

One challenge facing organizations is the enablement of collaboration in multidisciplinary teams, especially when different backgrounds and levels of expertise may inhibit team communication and may undermine the establishment of effective interactions in the workplace. In addition, documented work processes used by multidisciplinary teams may be often limited to a list of automated actions, steps, or decisions which may not efficiently incorporate human's feedback and best practices.

What is needed is an effective framework for multidisciplinary collaboration that may enable the establishment of an effective relationship model in the workplace. It may be also desirable a system and method that may identify, classify and measure lived-work practices to be incorporated in documented work processes.

SUMMARY

Systems and methods for the creation of a relationship model suitable for multidisciplinary collaboration are disclosed herein. According to some embodiments, this relationship model may be based on lived-work practices shared between the members or users of a multidisciplinary team within a knowledge ecosystem in order to improve upon their own practices and skills.

In one embodiment, a sub-system for implementing this relationship model may include an algorithm for determining suitable working relationships between the members or users of the multidisciplinary team; a visualization element that may include an intelligent user interface to visualize and organize these relationships in groups according to members' project roles, expertise, and/or relevance; and the analysis of lived-work practices and/or knowledge content, and their incorporation back into the sub-system in order to optimize the processes and relationships of the multidisciplinary team. This sub-system may be implemented through a software module of the knowledge ecosystem.

In another embodiment, a relation model may include a plurality of members or users with a multidisciplinary team project, where members may establish relationships and form groups based on their profiles, roles, expertise, and other factors. In yet another embodiment, an intelligent user interface may illustrate the profiles of team members and their respective groups.

In yet another embodiment, a user interface may display information where users or team members may be separated in groups according to their areas of expertise or roles assumed in a project. In a further embodiment, a user interface may provide information about assessment of skills and techniques for a particular user or team member, where this assessment may be used for making role recommendations within a multidisciplinary team project.

The disclosed method and sub-system for multidisciplinary collaboration may analyze relationships between team members and their lived-work practices in order to adjust the system based on human's behavior and work output, thereby complementing documented work processes.

In one embodiment, a method comprises identifying, by a computer, records in a database associated with each of a plurality of users on a team received from a computing device; determining, by the computer, which of the records of the plurality of users are related to each other; determining, by the computer, how the related users are related to each other based on attributes of the records; analyzing, by the computer, lived-work practices of the users to compared documented work processes to actual performance of the users; in response to analyzing, automatically establishing, by the computer, a link between records of related users based upon the determined relationship and analysis of lived-work practices; and in response to establishing, automatically forming, by the computer, a plurality of groups of users based on the established links between records of users, wherein each user is assigned to one of the plurality of groups.

In another embodiment, a system comprises a non-transitory computer-readable medium comprising computer instructions that when executed by a processor render a graphical user interface displayed by a computer and configured to separate team members into a plurality of groups according to each team member's areas of expertise in a project and lived-work practices of the team members, wherein the team members are visually connected on the graphical user interface to represent a collaboration of the team members.

In yet another embodiment, a system for generating a relationship model comprises a processor; and a non-transitory computer-readable medium having computer-readable instructions that when executed by the processor is configured to: execute an algorithm for determining at least one relationship between at least two of a plurality of users; render a visualization element having a graphical user interface to visualize the at least one relationship in a plurality of groups, wherein each group comprises at least one of the plurality of users; and adjust the at least one relationship based upon an analysis of lived-work practices and use of knowledge content by the plurality of users.

The exemplary embodiments described herein are directed to improving the efficiency of processing knowledge information. The systems and methods use a specially-programmed computer system that has the capability to perform the complex computations and automated functionality that cannot be reasonably performed by a person. The computations and functionality are envisioned to be performed by a non-human system, including hardware, software, and/or firmware. The computations and functionality cannot be performed by a generic computer, but rather a specially-programmed computer that is configured to perform the complex computations and functionality described herein. The techniques and processes described herein may also improve the efficiency of the specially-programmed computer by performing discrete tasks that can more optimally process data.

Additional features and advantages can become apparent from the detailed descriptions which follow, taken in conjunction with the accompanying drawings.

Definitions

As used here, the following terms may have the following definitions:

"Knowledge" refers to information, acquired or derived by one or more participants in one or more projects for use in one or more other projects.

"Knowledge management" refers to the process of acquiring, organizing, storing, sharing and using knowledge by organizations or individuals.

"Knowledge map" refers to a diagram used for visualizing flow of knowledge and duties before, during and after a project execution.

"Knowledge ecosystem" refers to people creating knowledge through networks of collaboration that may be supported by a technology network of knowledge bases and communication links.

"Knowledge content" refers to the work output produced by the members of a knowledge ecosystem, where this content may have a life cycle that matures from tribal knowledge to conventional wisdom through the structure of the ecosystem. Knowledge content may be in the form of a piece of documentation such as memos, notes, emails, directories, articles, white papers, and case studies, among others, where this documentation may be relevant to execute tasks of interest within an organization.

"Knowledge base" refers to a collection of knowledge content saved in an electronic storage system and that may be later retrieved for implementation in future projects.

"Knowledge based assignment module" refers to a module which may be part of a knowledge ecosystem which is responsible to gather necessary information to perform an optimal assignment of a set of employees to a set of projects.

"Multidisciplinary collaboration" refers to the collaboration between professionals in different areas of expertise.

"Lived-work practices" refers to a representation of how work is accomplished, where this representation may be fed into an ecosystem to improve its functioning and optimize its work processes.

BRIEF DESCRIPTION OF THE DRAWINGS

The present disclosure can be better understood by referring to the following figures. The components in the figures are not necessarily to scale, emphasis instead being placed upon illustrating the principles of the disclosure. In the figures, reference numerals designate corresponding parts throughout the different views.

DETAILED DESCRIPTION

Figure 1:
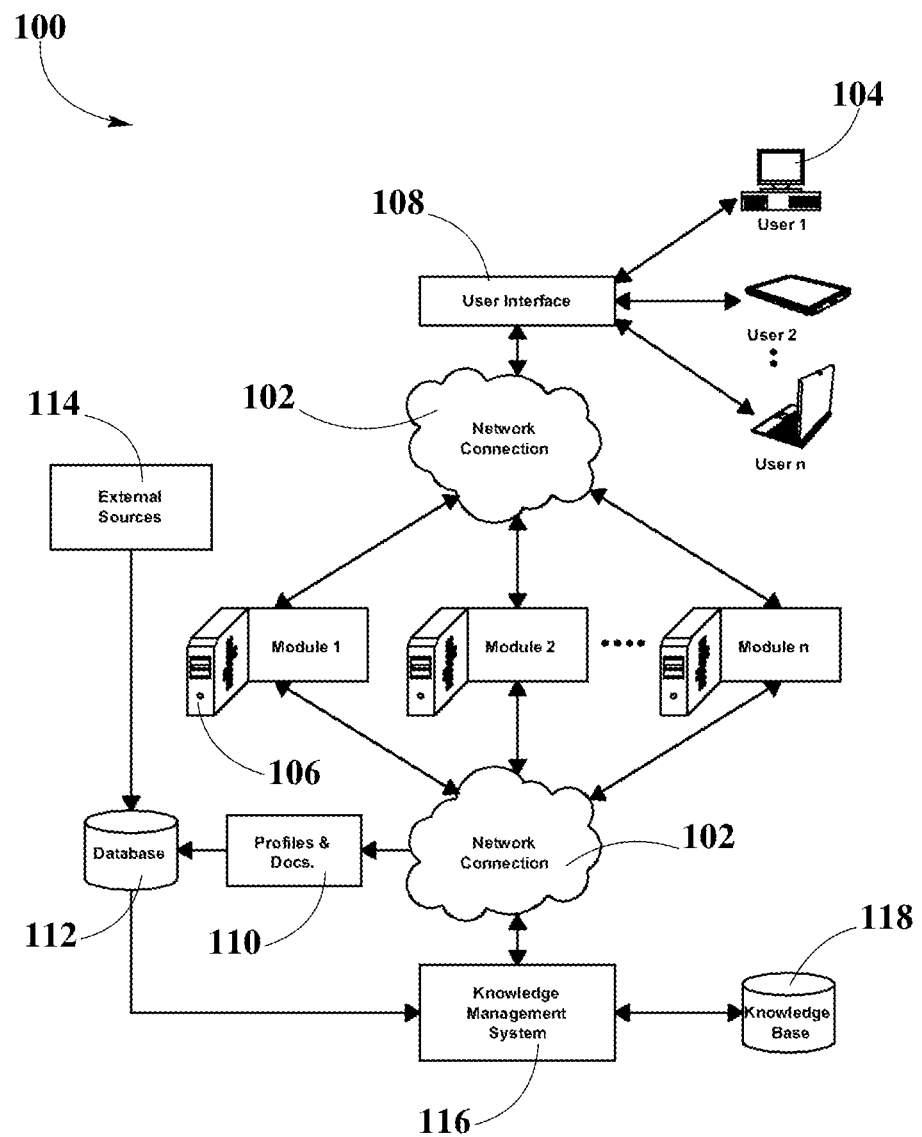
FIG. 1 shows a system architecture for a knowledge ecosystem according to an exemplary embodiment.

The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

The exemplary embodiments described herein are directed to improving the efficiency of processing knowledge information. The systems and methods use a specially-programmed computer system that has the capability to perform the complex computations and automated functionality that cannot be reasonably performed by a person. The computations and functionality are envisioned to be performed by a non-human system, including hardware, software, and/or firmware. The computations and functionality cannot be performed by a generic computer, but rather a specially-programmed computer that is configured to perform the complex computations and functionality described herein. The techniques and processes described herein may also improve the efficiency of the specially-programmed computer by performing discrete tasks that can more optimally process data.

FIG. 1 shows an exemplary system architecture 100 for a knowledge ecosystem. The knowledge ecosystem described here may enable automated human-to-human collaboration through the use of system architecture 100. The disclosed system architecture 100 may include different components which may dynamically interact with each other through network connections 102. Network connections 102 may refer to any suitable connections between computers such as, for example, intranets, local area networks (LAN), virtual private networks (VPN), wireless area networks (WAN) and the internet among others.

In the knowledge ecosystem, one or more client computing devices 104 may display a graphical user interface 108 configured to receive information from one or more users and interact with one or more software modules 106. Examples of client computing devices 104 may include smartphones, desktop computers, laptop computers, tablets, and PDAs, among others. Software modules 106 may include any software used by key areas of an organization such as, for example, accounting software, human resources software, project management, organizational social networks, search engines and/or any other suitable software from where knowledge of an organization may be derived.

In addition, each software module 106 may be executed by a server, a single computer or multiple computers in a distributed configuration.

User interface 108 displayed in client computing devices 104 may exhibit an intelligent feature for not only supporting human-computer interactions but also providing technology supported and socially enabled human-to-human collaboration for co-located and geographically diverse work teams alike. User interface 108 may act as a single portal for accessing different software modules 106 and may be tailored to users depending on the access rights predetermined for those specific users. In another embodiment, an independent user interface 108 may exist for each software module 106.

Interaction between client computing devices 104 and software modules 106 may generate raw data 110 such as user profiles, documents, project information, metrics, emails and worksheets among others. Software modules 106 may transmit raw data 110 through network connection 102 to a database 112 for storing. Database 112 may be implemented through database management systems (DBMS) such as, for example, MySQL, PostgreSQL, SQLite, Microsoft SQL Server, Microsoft Access, Oracle, SAP, dBASE, FoxPro, IBM DB2, LibreOffice Base, FileMaker Pro and/or any other type of database that may organize collections of data.

External sources 114 may also feed raw data 110 to database 112. Examples of external sources 114 may include the world wide web, external social networks, external consulting, third party providers, external project sources and/or any external data that may serve to produce knowledge.

Finally, a knowledge management system 116 may manage and process the flow of information within the knowledge ecosystem. For example, knowledge management system 116 may retrieve and process raw data 110 stored in database 112 to consequently derive knowledge from raw data 110. Knowledge may then be stored in a knowledge base 118. Knowledge management system 116 may also pull knowledge from knowledge base 118 when requested by client computing devices 104 or software modules 106. According to some aspects of this embodiment, client computing devices 104 and software modules 106 may consume or produce raw data 110 and/or knowledge as required by the application. In one embodiment, the knowledge derived from raw data 110 and stored in knowledge base 118 can become part of system architecture 100.

Knowledge management system 116 may include one or more computers suitable for executing knowledge management software according to embodiments described here. Knowledge base 118 may be implemented through database management systems (DBMS) such as, for example, MySQL, PostgreSQL, SQLite, Microsoft SQL Server, Microsoft Access, Oracle, SAP, dBASE, FoxPro, IBM DB2, LibreOffice Base, FileMaker Pro and/or any other type of database that may organize collections of data.

Figure 2:
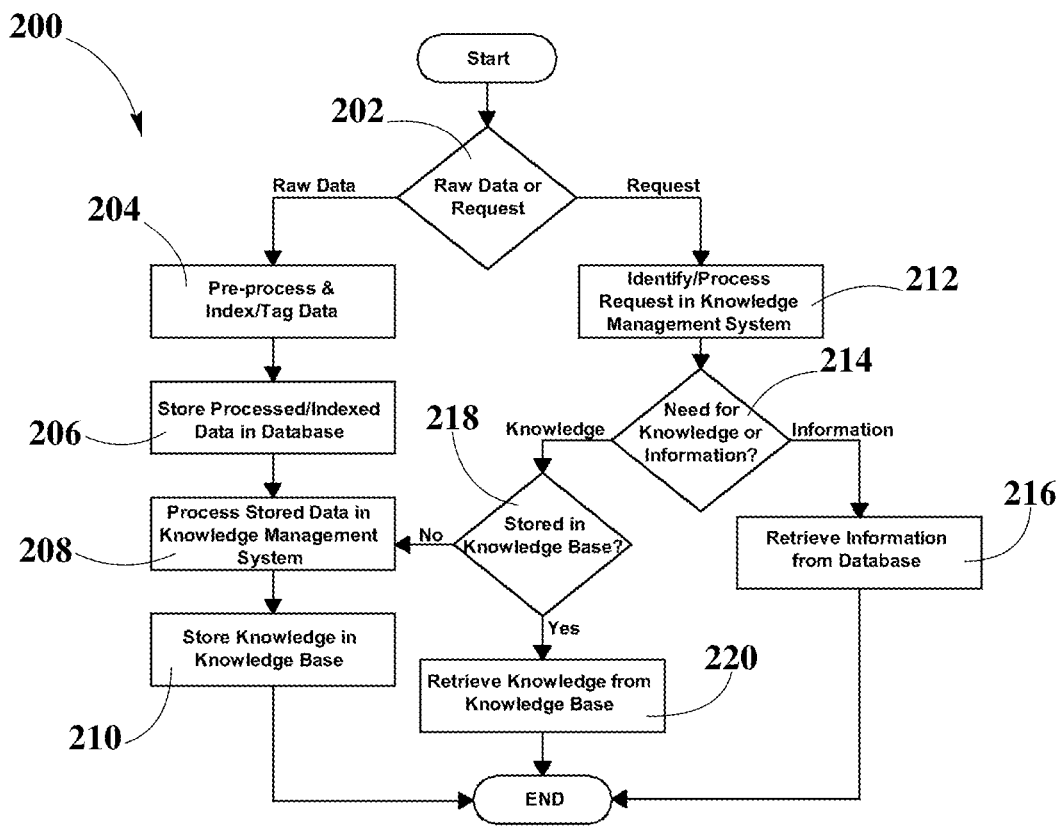
FIG. 2 depicts a flowchart of an input/request management process in a knowledge ecosystem according to an exemplary embodiment.

FIG. 2 is a flowchart of input/request management process 200, according to an embodiment.

The process may start when raw data or requests may be generated from the interaction of one or more client computing devices with one or more software modules within a knowledge ecosystem. Examples of client computing devices may include smartphones, desktop computers, laptop computers, tablets, and PDAs, among others. Software modules may include any software used by key areas of an organization such as, for example, accounting software, human resources software, organizational social networks, project management, search engines and/or any other suitable software from where knowledge of an organization may be derived. In addition, each software module may be executed by a server, a single computer or multiple computers in a distributed configuration.

Raw data may include user profiles, documents, project information, metrics, emails and worksheets, among others. Requests may include the demand for information or knowledge.

Software modules may classify between raw data or requests, at step 202. Subsequently, at step 204, software modules may send raw data to a database where one or more sets of raw data may be analyzed, classified, indexed, and tagged using one or more information processing algorithms designed to process one or more types of data, allowing the conversion of raw data into preprocessed information. In some embodiments, this process may be done using data mining, and other suitable data processing tools. The database may be implemented through database management systems (DBMS) such as, for example, MySQL, PostgreSQL, SQLite, Microsoft SQL Server, Microsoft Access, Oracle, SAP, dBASE, FoxPro, IBM DB2, LibreOffice Base, FileMaker Pro and/or any other type of database that may organize collections of data.

The database may store the preprocessed information at step 206, until a knowledge management system determines that there is a need for analyzing one or more sets of preprocessed information. Knowledge management system may include one or more computers suitable for executing knowledge management software according to embodiments described here.

The need for analyzing one or more sets of preprocessed information may arise from a client computing device generated request or from a software module generated request. If the knowledge management system determines there is a need for new knowledge within the knowledge ecosystem, knowledge management system may analyze one or more sets of preprocessed information according to the identified knowledge needs, at step 208. In some embodiments, knowledge management system may use additional processing tools from one or more software modules during the analysis of preprocessed information.

Following step 208, knowledge management system may analyze and compare one or more sets of processed information against one or more knowledge needs identified within the knowledge ecosystem. Knowledge management system may identify knowledge from the processed information, where this knowledge may be useful for improving the performance of one or more tasks in a project. At step 210, the knowledge management system may store the identified knowledge in a knowledge base and the process may end. In some other embodiments, knowledge management system may store only indexed references or tags of the one or more useful processed information sets or subsets in knowledge base.

Knowledge base may be implemented through database management systems (DBMS) such as, for example, MySQL, PostgreSQL, SQLite, Microsoft SQL Server, Microsoft Access, Oracle, SAP, dBASE, FoxPro, IBM DB2, LibreOffice Base, FileMaker Pro and/or any other type of database that may organize collections of data.

At step 202, software modules may send requests to the knowledge management system for analysis, at step 212. Knowledge management system may classify the requests to determine if there is a need for knowledge or for information, at step 214. In one embodiment, information may refer to facts or details about users, tasks, projects, and general activities within the knowledge ecosystem. In one example, information may include a user's name. In one embodiment, knowledge may refer to information, acquired, processed or derived by client computing devices, software modules, and knowledge management system, where this information may be useful for improving one or more tasks in one or more projects. In another embodiment, knowledge may be provided to a group of people with similar roles, and then may be escalated to other groups or communities as required by the application. In an example where the information is a user's name, if a nick name is used instead of the full name, it may be more successful in closing sales, so a request may desire the nick name instead of the full name.

Following the process, if there is a need for information, knowledge management system may retrieve the necessary one or more sets or subsets of information from the database, at step 216, and the process may end.

If there is a need for knowledge, knowledge management system may determine if the necessary knowledge to address the identified need is already stored in the knowledge base, at step 218. If the necessary knowledge is already stored in the knowledge base, then knowledge management system may retrieve the required knowledge from the knowledge base and send knowledge back to one or more client computing devices and/or software modules, at step 220. If necessary knowledge is not yet stored in the knowledge base, knowledge management system may retrieve and analyze one or more sets of preprocessed data from the database and subsequently store identified knowledge in knowledge base, at step 210, and the process may end.

Figure 3:
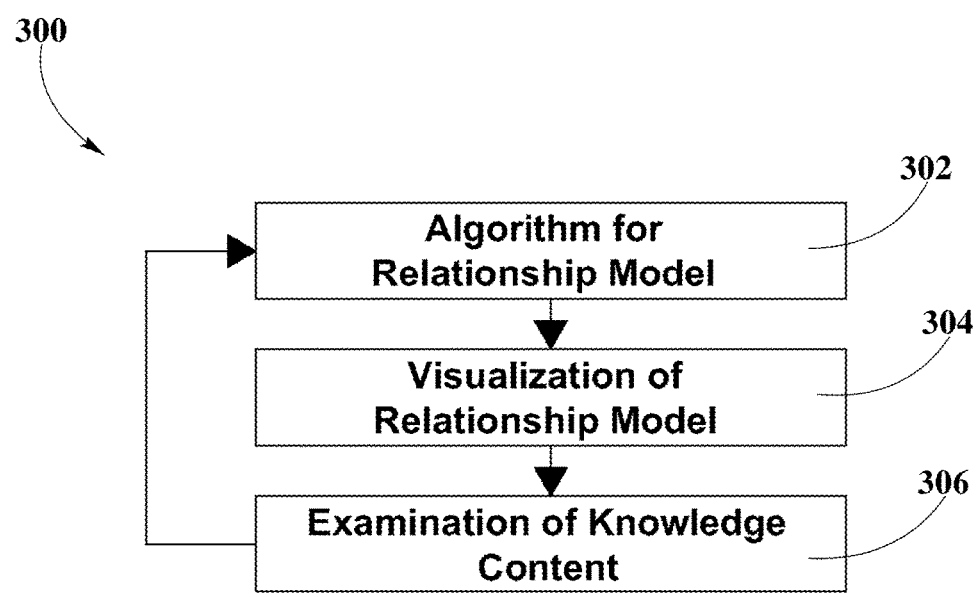
FIG. 3 illustrates a simplified block diagram of elements of a system for multidisciplinary collaboration according to an exemplary embodiment.

FIG. 3 is a simplified block diagram of elements of a sub-system 300 for multidisciplinary collaboration, according to an embodiment. Sub-system 300 may be part of a knowledge ecosystem and may operate based on a relationship model where a plurality of team project members or users may interact with each other in the context of multidisciplinary collaboration. In one embodiment, sub-system 300 may be implemented through a software module integrated in the knowledge ecosystem, where this software module may be run by a server, a single computer or multiple computers in a distributed configuration.

In the relationship model of sub-system 300, collaboration is not only based on depositing, sharing, or updating documents in sub-system 300, but more importantly, on learning from each other lived-work practices to improve on their own practices. In addition, this relationship model may be user-centric and may be focused on lived-work practices, instead of just focusing on documented work processes which may follow specific work rules or guidelines. A user-centric approach may allow users or team members to search, explore and learn from the rest of team, from the context of work output or knowledge content.

Sub-system 300 may include an algorithm 302 for creating, establishing, and managing interactions of team members within the relationship model. The algorithm 302 may determine who is related to whom, and in what way. This algorithm 302 may be implemented through suitable programming languages and may be executed through suitable networking and computing equipment included in a software module within the ecosystem. In one embodiment, algorithm 302 may also manage and establish relationships with collaborators outside the multidisciplinary project team. In another embodiment, algorithm 302 may determine the levels of expertise required in different knowledge areas or work groups for determining and establishing suitable relationships between team members. Yet in another embodiment, algorithm 302 may determine the roles of team members throughout the execution of a multidisciplinary project. For example, the initial roles assumed by team members at the beginning of a multidisciplinary project may be adjusted by algorithm 302 according the knowledge content produced, analysis of lived-work practices, levels of expertise acquired and the interactions between team members, among others considerations.

The relationships established by algorithm 302 may be graphically represented in a visualization 304 element of sub-system 300, where visualization element may be executed through a suitable intelligent user interface running in one or more client computing devices such as smartphones, desktop computers, laptop computers, tablets, or PDAs. This intelligent user interface may organize team members in a plurality of groups based on their profiles and/or roles within the multidisciplinary team. For example, there may be groups for managers, business analysts, developers, outside consultants, test engineers, among others. User profiles and groups may be also classified according to their relevance within sub-system 300.

Although the relationship model implemented in sub-system 300 may be designed for supporting documented work processes, sub-system 300 may also be capable of examining the knowledge content 306 produced within the ecosystem and adapt accordingly. That is, sub-system 300 may determine how users or team members, through the use of computing devices and software modules, interact with knowledge content 306, where this knowledge content 306 can be incorporated back into algorithm 302 and displayed through visualization 304 element for improving or optimizing the relationship model in sub-system 300. In one embodiment, sub-system 300 may determine team members, who through the use of client computing devices or software modules, may be producing or consuming knowledge content during the execution of a multidisciplinary project. In another embodiment, sub-system 300 may also analyze lived-work practices of the team members to incorporate them into algorithm 302 and visualization 304 elements for optimizing documented work processes within sub-system 300 and improving best practices of the team members. For example, sub-system 300 may analyze the functions, interactions, and actions of team members within a multidisciplinary team to compare what is described in the documented work processes to the actual behavior or work performance of team members, thereby determining what are the lived-work practices that can be incorporated into subsystem 300 to account for human behavior.

Knowledge content and lived-work practices may be indicative of team members' ability to make decisions outside documented work processes. Thereby, analysis and incorporation of knowledge content 306 and lived-work practices may allow sub-system 300 to constantly adapt according to human behavior and may also allow team members to become better practitioners.

Figure 4:
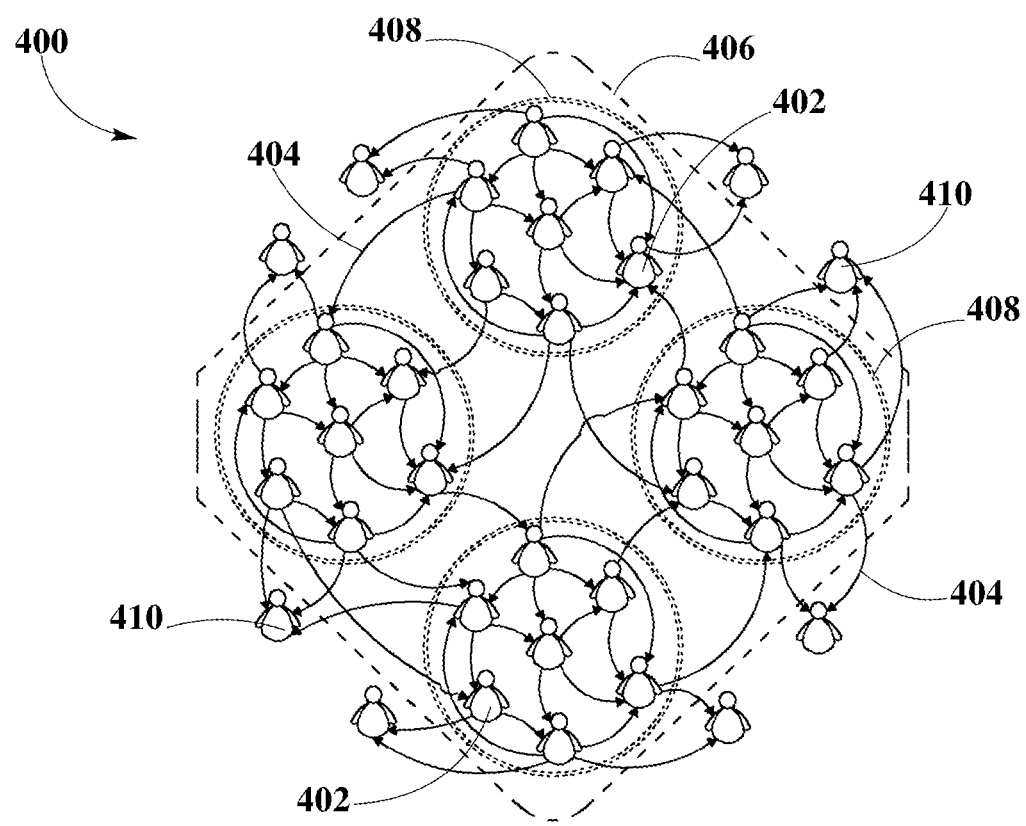
FIG. 4 shows a diagram of a relationship model that may be used for multidisciplinary team collaboration according to an exemplary embodiment.

FIG. 4 illustrates a diagram of a relationship model 400 that may be used for multidisciplinary team collaboration. According to some aspects of this embodiment, a software module within a knowledge ecosystem may implement this relationship model 400 for establishing relationships between one or more client computing devices being used by one or more members of a multidisciplinary team. Software module may be run by a server, a single computer or multiple computers in a distributed configuration; while client computing devices may include smartphones, desktop computers, laptop computers, tablets, and PDAs, among others.

Relationship model 400 may contemplate a framework where members 402 within the same project team 406 may collaborate with each other, establishing relationships 404 and forming groups 408 based on members' profiles and/or roles. For example, there may be groups 408 of business analysts, project managers, test engineers, developers, and the like. The group may be defined by job title or discipline, and may be based upon roles, work overlaps, hand-offs, and interactions between disciplines. The taxonomy includes associative relationships associated with expertise and role attributes in addition to discipline, process, and practice knowledge. In one embodiment, the roles assumed by the members of a particular group 408 may vary or evolve during the execution of a project. Members 402 within these groups 408 may establish relationships 404 with members of other groups 408 as required by the application. In one embodiment, the establishment of relationships 404 may be assisted by a computer algorithm within a software module of the ecosystem, and implemented through suitable programming languages. According to some aspects of this embodiment, relationships 404 may be based on the collaboration between team members 402 and may be assessed according the knowledge content produced through relation model 400 and the levels of expertise of the team members 402. Relationships 404 may also employ knowledge maps for deriving and distributing knowledge across members 402. In one embodiment, knowledge may be provided to a group 408 of members with similar roles, and can be then escalated to other groups 408 or communities as required by the application.

In relationship model 400, a plurality of team members 402 may share their work and lived-work practices following many-to-many approach, thereby allowing each member 402 on the project team 406 to save and find their own work, and see other member 402 work more easily. According to some aspect of this embodiment, relationship model 400 may also include collaborators 410 outside project team 406, where these collaborators 410 may work and support members 402 according to their expertise.

An exemplary process for forming the groups shown in FIG. 4 is as follows. The process comprises identifying, by a computer, records in a database associated with each of a plurality of users on a team received from a computing device; determining, by the computer, which of the records of the plurality of users are related to each other; determining, by the computer, how the related users are related to each other based on attributes of the records; analyzing, by the computer, lived-work practices of the users to compared documented work processes to actual performance of the users; in response to analyzing, automatically establishing, by the computer, a link between records of related users based upon the determined relationship and analysis of lived-work practices; and in response to establishing, automatically forming, by the computer, a plurality of groups of users based on the established links between records of users, wherein each user is assigned to one of the plurality of groups. The groups may be displayed on a user interface. This exemplary process can improve the operational efficiency of managing knowledge.

Figure 5:
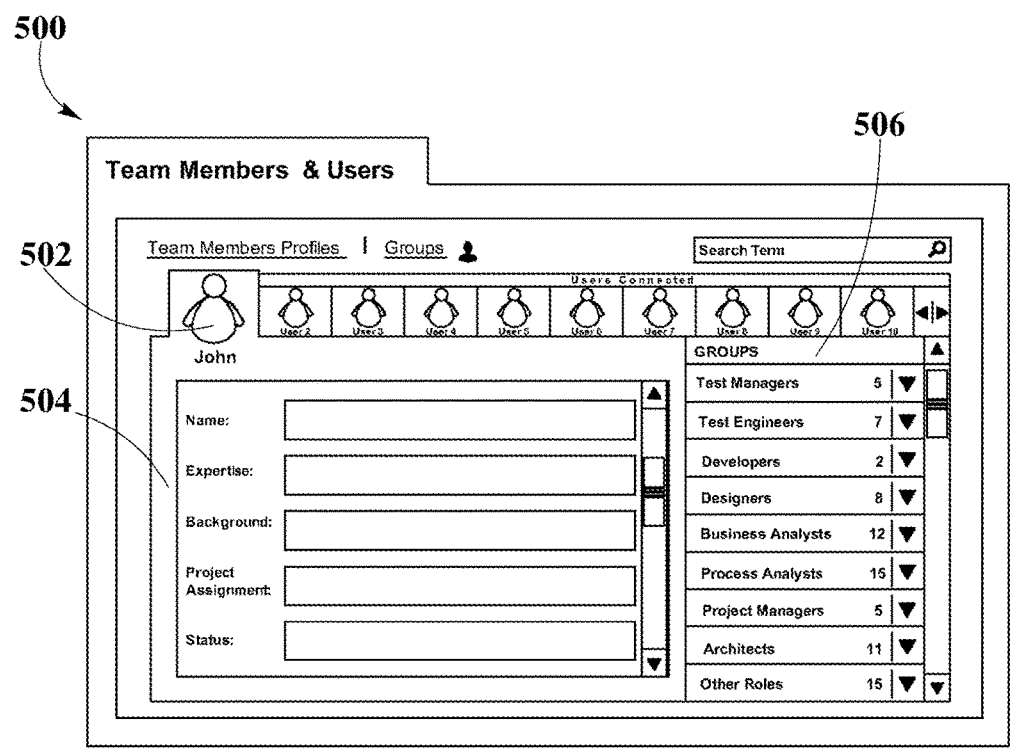
FIG. 5 depicts an intelligent user interface that may be used for managing and organizing multidisciplinary project team collaborations according to an exemplary embodiment.

FIG. 5 illustrates a portal for an intelligent user interface 500 to manage and organize multidisciplinary project team collaborations within a knowledge ecosystem, according to an embodiment.

User interface 500 may be configured according to the tasks and operations performed in one or more software modules within a knowledge ecosystem. Software modules may generate user interface 500 through suitable computing devices such as a desktop computers, workstations, and servers running any suitable operating systems and software packages. User interface 500 may be displayed in one or more client computing devices such as smartphones, tablets, laptop computers, desktop computers, and PDAs, among others. One or more members within a multidisciplinary project team may employ client computing devices for accessing and using user interface 500.

The intelligent user interface 500 may display team members' profiles 504 according to user preferences or settings. User interface 500 may display the profiles of a plurality of users 502 or team members, including relevant information such as name, expertise, background, project assignment, status, and the like.

User interface 500 may also separate users 502 in groups 506 according to their expertise and/or collaboration roles. For example, in a multidisciplinary project team, a particular user 502 or team member may have groups 506 for designers, developers, project managers, business analysts, and the like, where these groups may be determined by user 502 relationships or interactions within the multidisciplinary project team. Different levels of expertise may be established for each group 506.

Intelligent user interface 500 may be driven by an algorithm within the software module, where this algorithm which may create, establish, manage, and/or support relationships or interactions of a plurality of users 502 within the multidisciplinary team. In one embodiment, user interface 500 may display information about the lived-work practices derived by the algorithm included in one or more software modules of the knowledge ecosystem.

Figure 6:
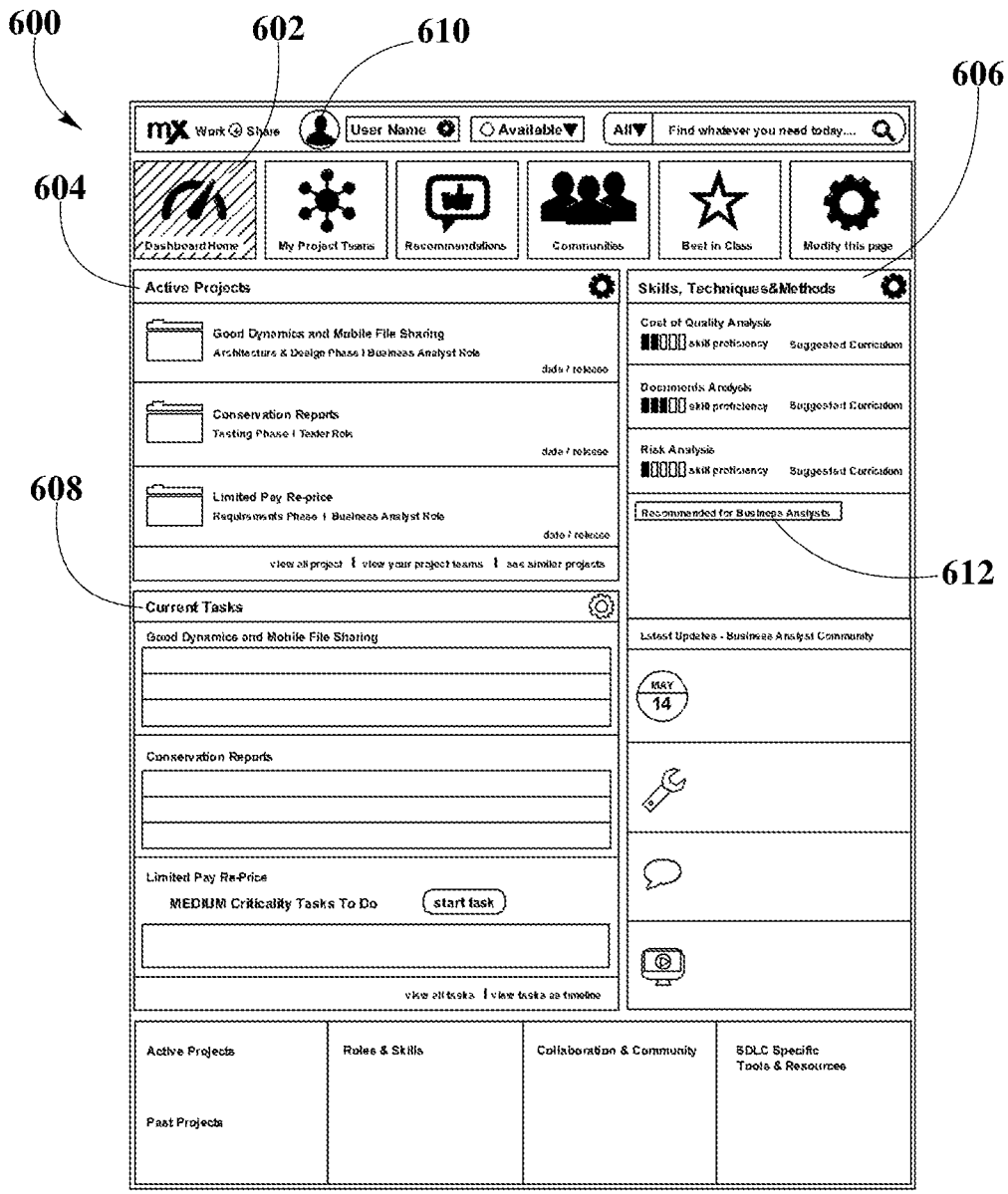
FIG. 6 depicts an intelligent user interface that may be used for ranking the expertise of team members within a multidisciplinary project team according to an exemplary embodiment.

FIG. 6 shows another example of an intelligent user interface 600 that may be used for assisting multidisciplinary project team collaborations within a knowledge ecosystem, according to an embodiment.

User interface 600 may be configured according to the tasks and operations performed in one or more software modules within a knowledge ecosystem. Software modules may generate user interface 600 through suitable computing devices such as a desktop computers, workstations, and servers running any suitable operating systems and software packages. User interface 600 may be displayed in one or more client computing devices such as smartphones, tablets, laptop computers, desktop computers, and PDAs, among others. One or more members within a multidisciplinary project team may employ client computing devices for accessing and using user interface 600.

User interface 600 may display a dashboard home 602 which may include qualitative and quantitative information about active projects 604, skills and techniques 606, and current tasks 608.

Active projects 604 may include information about status, roles and project reports.

Skills and techniques 606 may include an analysis, assessment, and ranking of the abilities of a particular member or user 610 related to a particular project. For example, user 610 may be ranked in different skills and techniques 606 such as cost analysis, document analysis, and risk analysis, where user 610 may rank higher in "document analysis skill" as depicted in FIG. 6. These rankings may be used for making suitable role recommendation 612, as in this particular example, user 610 may be recommended for the role of Business Analyst. The disclosed skills and techniques 606 information aforementioned may be used as qualitative and quantitative parameters for selection of new members into a multidisciplinary project team. Different levels of expertise may be established for each role.

Current tasks 608 may include file sharing, reports, reviews, and status of critical tasks to do in a project.

User interface 600 may also display other tabs related to project teams, recommendations, communities, best in class, and settings, among others.

In one example, a system may be designed for assisting an underwriting process for a particular insurance product, where this process may be documented based on the steps and decision points that may be taken during the underwriting process. The underwriting process may be performed by a multidisciplinary team in different geographic locations. The system may include an algorithm for determining relationships between people involved in the underwriting process, as well as a visualization interface for managing those relationships. The system may be able to analyze how people involved in the underwriting process perform specific actions or tasks (outside the documented work processes) which can be captured in the form of lived-work practices. Specifically, the system may derive live-work practices by observing and analyzing how people perform their work outside the documented work processes or flow, thereby accounting for human behavior. These lived-work practices may be fed and visualized in the system in order to optimize the work of multidisciplinary team(s) of people involved in the underwriting process.

The foregoing method descriptions and the process flow diagrams are provided merely as illustrative examples and are not intended to require or imply that the steps of the various embodiments must be performed in the order presented. As will be appreciated by one of skill in the art the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed here may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description here.

When implemented in software, the functions may be stored as one or more instructions or code on a non-transitory computer-readable or processor-readable storage medium. The steps of a method or algorithm disclosed here may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used here, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

When implemented in hardware, the functionality may be implemented within circuitry of a wireless signal processing circuit that may be suitable for use in a wireless receiver or mobile device. Such a wireless signal processing circuit may include circuits for accomplishing the signal measuring and calculating steps described in the various embodiments.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

Any reference to claim elements in the singular, for example, using the articles "a," "an" or "the," is not to be construed as limiting the element to the singular.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein

What is claimed is:

1. A computer-implemented method comprising:
   identifying, by a computer, records in a database associated with each of a plurality of users, wherein a record of each of the plurality of users comprises a user profile;
   determining, by the computer, the records of the plurality of users that are related to each other based on attributes associated to the records, wherein the attributes associated to the records comprises at least a level of expertise associated to each of the plurality of users;
   generating, by the computer, one or more teams containing users to execute one or more tasks, wherein each of the one or more teams comprises users from the plurality of users that are related to each other based on attributes of their records;
   determining, by the computer, lived-work practices of the users of each of the one or more teams for executing the one or more tasks, wherein the lived-work practices comprises a process undertaken by the users to complete the one or more tasks;
   collecting, by the computer, raw data comprising exchange of interactions between the users of each of the one or more teams generated from a plurality of interactions on a plurality of social networking sources between the users of each of the one or more teams and a plurality of user interfaces, wherein the plurality of user interfaces are displayed, by the computer, on a plurality of computing devices associated with the plurality of users, wherein the raw data is stored in the database;
   tagging and indexing, by the computer, the raw data to generate preprocessed data and storing the preprocessed data in the database;
   determining, by the computer, the preprocessed data associated to each of the plurality of users and the attributes associated to each of the users within their respective record;
   receiving, by the computer, from a client computing device, a request associated with execution of a new project;
   determining, by the computer, whether the execution of the new project requires knowledge or information associated to the plurality of users based on analysis of tasks within the new project;
   upon determining that the request is for the knowledge associated to the plurality of users, automatically generating, by the computer, a plurality of groups comprising users from the plurality of users to execute the tasks of the new project based on the preprocessed data associated to each of the plurality of users and the attributes associated to each of the users within their respective record, wherein each user is assigned to one of the plurality of groups; and
   upon determining that the request is for the information associated to the plurality of users, automatically generating, by the computer, a plurality of groups comprising users from the plurality of users to execute the tasks of the new project based on the the lived-work practices of each of the users of each of the one or more teams while executing the one or more tasks and the attributes associated to each of the users within their respective record, wherein each user is assigned to one of the plurality of groups.

2. The method according to claim 1, further comprising displaying, by the computer, a graphical user interface on the computing device of each of the plurality of users that provides a profile of a user and one or more groups associated with the user.

3. The method according to claim 1, further comprising determining, by the computer, relationship between the users on each of the one or more teams with the users outside of their team.

4. The method according to claim 1, wherein the each of the one or more teams comprises the users having a same job title or discipline.

5. The method according to claim 4, wherein the at least one team of the one or more teams comprises managers.

6. The method according to claim 1, wherein the each of the one or more teams comprises the users having a same job function.

7. The method according to claim 6, wherein the each of the one or more teams comprises developers, consultants, or engineers.

8. The method according to claim 1, further comprising optimizing, by the computer, the links based upon how the users interact with knowledge content.

9. The method according to claim 1, wherein each of the one or more teams is based upon a profile, role, or expertise of the users.

10. A system comprising:
    a non-transitory computer-readable medium comprising computer instructions that when executed by a processor render a graphical user interface displayed by a computer and configured to:
    identify records in a database associated with each of a plurality of users, wherein a record of each of the plurality of users comprises a user profile;
    determine the records of the plurality of users that are related to each other based on attributes associated to the records, wherein the attributes associated to the records comprises at least a level of expertise associated to each of the plurality of users;
    generate one or more teams containing users to execute one or more tasks, wherein each of the one or more teams comprises users from the plurality of users that are related to each other based on attributes of their records;
    determine lived-work practices of the users of each of the one or more teams for executing the one or more tasks, wherein the lived-work practices comprises a process undertaken by the users to complete the one or more;
    collect raw data comprising exchange of interactions between the users of each of the one or more teams generated from a plurality of interactions on a plurality of social networking sources between the users of each of the one or more teams and a plurality of user interfaces, wherein the plurality of user interfaces are displayed, by the computer, on a plurality of computing devices associated with the plurality of users, wherein the raw data is stored in the database;

tag and index the raw data to generate preprocessed data and storing the preprocessed data in the database;

determine the preprocessed data associated to each of the plurality of users and the attributes associated to each of the users within their respective record;

receive from a client computing device a request associated with execution of a new project;

determine whether the execution of the new project requires knowledge or information associated to the plurality of users based on analysis of tasks within the new project;

upon determining that the request is for the knowledge associated to the plurality of users, automatically generate a plurality of groups comprising users from the plurality of users to execute the tasks of the new project based on the preprocessed data associated to each of the plurality of users and the attributes associated to each of the users within their respective record, wherein each user is assigned to one of the plurality of groups; and upon determining that the request is for the information associated to the plurality of users, automatically generate a plurality of groups comprising users from the plurality of users to execute the tasks of the new project based on the lived-work practices of each of the users of each of the one or more teams while executing the one or more tasks and the attributes associated to each of the users within their respective record, wherein each user is assigned to one of the plurality of groups.

11. The system according to claim 10, wherein the graphical user interface of the computing device of each of the plurality of users provides information about assessment of skills of the user.

12. The system according to claim 11, wherein the instructions are further configured to make a role recommendation for each of the plurality of users based upon the assessment of their lived-work practices.

13. The system according to claim 10, wherein each of the one or more teams is based upon a profile or role of each user.

14. The system according to claim 10, wherein each of the one or more teams comprises the users having a same job title.

15. The system according to claim 14, wherein each of the one or more teams comprises managers.

16. The system according to claim 10, wherein each of the one or more teams comprises the users having a same job function.

17. The system according to claim 16, wherein each of the one or more teams comprises developers, consultants, or engineers.

18. The system according to claim 10, wherein each of the plurality of groups are separated based on how the users interact with knowledge content.

19. A system for generating a relationship model, the system comprising:

a processor; and a non-transitory computer-readable medium having computer-readable instructions that when executed by the processor is configured to:

execute an algorithm for determining at least one relationship between at least two of a plurality of users, wherein the at least one relationship is determined based on common attributes between the at least two users, and wherein the attributes comprising at least a level of expertise associated to each of the plurality of users is stored in a database;

generate one or more teams containing users to execute one or more tasks, wherein each of the one or more teams comprises users from the plurality of users that are related to each other based on attributes of their records;

determine lived-work practices of the users of each of the one or more teams for executing the one or more tasks, wherein the lived-work practices comprises a process undertaken by the users to complete the one or more;

collect data comprising exchange of interactions between the users of each of the one or more teams generated from a plurality of interactions on a plurality of social networking sources between the users of each of the one or more teams and a plurality of user interfaces, wherein the plurality of user interfaces are displayed, by the computer, on a plurality of computing devices associated with the plurality of users, wherein the raw data is stored in the database;

tag and index the raw data to generate preprocessed data and storing the preprocessed data in the database;

determine interaction data associated to each of the plurality of users and the attributes associated to each of the users within their respective record;

receive from a client computing device, a request associated with execution of a new project;

determine whether the execution of the new project requires knowledge or information associated to the plurality of users based on analysis of tasks within the new project;

upon determining that the request is for the knowledge associated to the plurality of users, automatically generate a plurality of groups comprising users from the plurality of users to execute the tasks of the new project based on the preprocessed data associated to each of the plurality of users and the attributes associated to each of the users within their respective record, wherein each user is assigned to one of the plurality of groups; and upon determining that the request is for the information associated to the plurality of users, automatically generate a plurality of groups comprising users from the plurality of users to execute the tasks of the new project based on the the lived-work practices of each of the users of each of the one or more teams while executing the one or more tasks and the attributes associated to each of the users within their respective record, wherein each user is assigned to one of the plurality of groups.

20. The system according to claim 19, wherein the database is communicatively coupled to the processor.

21. The system according to claim 19, wherein the database comprising data of knowledge content.

* * * * *